(12) United States Patent
Lee et al.

(10) Patent No.: US 12,546,600 B2
(45) Date of Patent: Feb. 10, 2026

(54) DEVICE AND METHOD FOR DETECTING GYROSCOPE ATTACK AND RECOVERING USING ACCELEROMETER

(71) Applicant: KOREA UNIVERSITY RESEARCH AND BUSINESS FOUNDATION, Seoul (KR)

(72) Inventors: Dong Hoon Lee, Seoul (KR); Hyunsu Cho, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 260 days.

(21) Appl. No.: 18/448,456

(22) Filed: Aug. 11, 2023

(65) Prior Publication Data

US 2024/0271931 A1  Aug. 15, 2024

(30) Foreign Application Priority Data

Aug. 16, 2022 (KR) .................. 10-2022-0102254

(51) Int. Cl.
*G01C 19/00* (2013.01)
*G01P 15/18* (2013.01)

(52) U.S. Cl.
CPC .............. *G01C 19/00* (2013.01); *G01P 15/18* (2013.01)

(58) Field of Classification Search
CPC ....... G01C 19/00; G01C 19/005; G01P 15/18; G01P 15/165; G01P 15/14
See application file for complete search history.

(56) References Cited

U.S. PATENT DOCUMENTS

2014/0195185 A1* 7/2014 Anderson ................. G01P 3/44
702/96
2020/0394302 A1* 12/2020 Nashimoto ............ G01C 21/16

FOREIGN PATENT DOCUMENTS

| JP | 2016-509211 A | 3/2016 |
| JP | WO2019/207652 A1 | 10/2019 |
| KR | 10-1008360 B1 | 1/2011 |
| KR | 10-1770913 B1 | 8/2017 |
| KR | 10-2194127 B1 | 12/2020 |
| KR | 10-2022-0069775 A | 5/2022 |

OTHER PUBLICATIONS

"Determining Angular Velocity and Angular Acceleration of Projectiles Using Triaxial Acceleration Measurements" by Costello et al. ( Year: 2002).*

* cited by examiner

*Primary Examiner* — Xin Y Zhong
(74) *Attorney, Agent, or Firm* — NSIP Law

(57) ABSTRACT

Disclosed herein is an attack detection device for detecting an attack targeting a gyroscope. The attack detection device includes: a data collection unit configured to receive measurement values from an accelerometer and the gyroscope; and an attack detection unit configured to estimate an angular velocity using the measurement value from the accelerometer, and to detect an attack by comparing the estimated angular velocity to an angular velocity measured by the gyroscope.

8 Claims, 3 Drawing Sheets

DEVICE AND METHOD FOR DETECTING GYROSCOPE ATTACK AND RECOVERING USING ACCELEROMETER

TECHNICAL FIELD

The present invention relates to an apparatus and method for detecting and recovering from an attack targeting a gyroscope using an accelerometer.

RELATED ART

A gyroscope is a sensor that measures an angular velocity (roll, pitch, or yaw) of a system rotating about each of three axes (x, y, and z). The angular velocity, which is measured in three axes using the gyroscope, is a measurement value used essentially in an unmanned vehicle system and is used to implement advanced autonomous driving functions such as an estimation of position and attitude and travel path planning.

In particular, a yaw angular velocity, which is measured in the z-axis of the gyroscope, is a measurement value used to obtain a direction of travel of the unmanned vehicle, detect oversteering and understeering, and is data that cannot be obtained with other sensors.

Recently, with the advancement of micro-electro mechanical system (MEMS) technology, most gyroscopes on the unmanned vehicle are manufactured with the MEMS technology. The MEMS-based gyroscope is vulnerable to an acoustic signal, which can cause errors in the measurement values. This is due to a unique structure inside the MEMS gyroscope and a method of measuring the angular velocity.

Inside the MEMS gyroscope is a very small mass and a spring that supports the mass, and when a Coriolis force is generated by the rotation, it is possible to measure this force in each axis and consequently measure the angular velocity. However, since the resonant frequency of the spring has a frequency band (~30 kHz) in the range that a general commercial grade speaker can output, an acoustic signal injected corresponding to that resonant frequency may cause errors in the measurement value of the angular velocity of the gyroscope.

These errors are vulnerabilities due to an inherent structure inside the MEMS gyroscope and a method of measuring the angular velocity, and are caused by the acoustic signal injection, which is a physical-level attack. Accordingly, it is difficult to detect and defend against the attack with general software-based protection techniques.

Therefore, an attacker may be able to intentionally inject the acoustic signal to cause errors in the measurement value of the gyroscope, leading to malfunctions of the unmanned vehicle, such as drone crashing or vehicle turning sharply.

DETAILED DESCRIPTION

Subject

The technical object to be achieved by the present invention is to provide a device and method for detecting and recovering from an attack targeting a gyroscope using an accelerometer.

Solution

There is provided an attack detection device according to an embodiment of the present invention. The attack detection device is a device for detecting an attack targeting a gyroscope, and the device includes: a data collection unit configured to receive measurement values from an accelerometer and the gyroscope; and an attack detection unit configured to estimate an angular velocity using the measurement value from the accelerometer, and to detect an attack by comparing the estimated angular velocity to an angular velocity measured by the gyroscope.

In addition, there is provided a device for detecting an attack, and the device includes: a data collection unit configured to collect first data and second data; a transformation equation derivation unit configured to derive a transformation equation to estimate an angular velocity from an acceleration using the first data; and an attack detection unit configured to estimate an angular velocity from an acceleration included in the second data using the transformation equation, and to detect an attack targeting a gyroscope based on the estimated angular velocity.

Effect

A device and method for detecting and recovering from an attack on a gyroscope, according to an embodiment of the present invention, has an effect of being capable of detecting a signal injection attack targeting a gyroscope.

MODE

Figure 1:
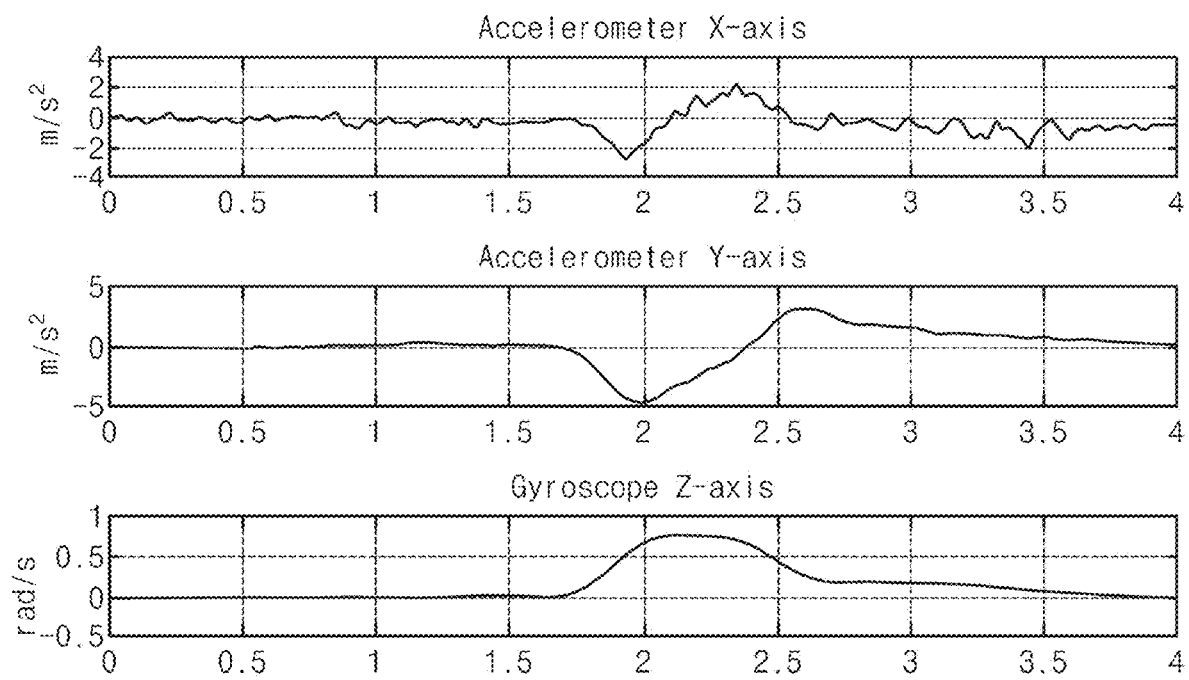
FIG. 1 is a graph illustrating measurement values of x-axis and y-axis acceleration and z-axis angular velocity when an unmanned vehicle is rotating.

The aforementioned features and effects of the disclosure will be apparent from the following detailed description related to the accompanying drawings and accordingly those skilled in the art to which the disclosure pertains may easily implement the technical spirit of the disclosure.

Various modifications and/or alterations may be made to the disclosure and the disclosure may include various example embodiments. Therefore, some example embodiments are illustrated as examples in the drawings and described in detailed description. However, they are merely intended for the purpose of describing the example embodiments described herein and may be implemented in various forms. Therefore, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure. As used herein, the term "and/or" includes any and all combinations of one or more of the associated listed items.

Unless otherwise clearly stated, when one element is described, for example, as being "connected" or "coupled" to another element, the elements should be construed as being directly or indirectly linked (i.e., there may be an intermediate element between the elements). Similar interpretation should apply to such relational terms as "between", "neighboring," and "adjacent to."

Terms used herein are used to describe a particular exemplary embodiment and should not be intended to limit the present invention. Unless otherwise clearly stated, a singular term denotes and includes a plurality. Terms such as "including" and "having" also should not limit the present invention to the features, numbers, steps, operations, subparts and elements, and combinations thereof, as described; others may exist, be added or modified. Existence and addition as to one or more of features, numbers, steps, etc. should not be precluded.

Unless otherwise clearly stated, all of the terms used herein, including scientific or technical terms, have meanings which are ordinarily understood by a person skilled in the art. Terms, which are found and defined in an ordinary dictionary, should be interpreted in accordance with their usage in the art. Unless otherwise clearly defined herein, the terms are not interpreted in an ideal or overly formal manner.

Example embodiments of the present invention are described with reference to the accompanying drawings. However, the scope of the claims is not limited to or restricted by the example embodiments. Like reference numerals proposed in the respective drawings refer to like elements.

The present invention relates to a device and method for detecting an angular velocity (any angular velocity, which may mean a yaw angular velocity) of a gyroscope damaged by an attack (e.g., an acoustic signal injection attack, etc.) and recovering the damaged angular velocity using a measurement value of an accelerometer (which may mean a MEMS accelerometer).

The device for detecting an attack targeting a gyroscope of the present invention may be equipped in a controller (or processor) of an unmanned vehicle in the form of software to estimate a yaw angular velocity in real time using a measurement value of an accelerometer.

When a difference between the estimated yaw angular velocity and the yaw angular velocity actually measured by a gyroscope exceeds a threshold, it is judged to be an attack situation and the actual measurement value of the gyroscope may be isolated and the estimated yaw angular velocity may be used.

Hereinafter, the relationship between x-axis and y-axis acceleration and z-axis angular velocity is described.

Sensor measurement values that are related to a motion of an unmanned vehicle in a two-dimensional plane are x-axis acceleration and y-axis acceleration, which may be measured by the accelerometer, and z-axis angular velocity, which may be measured by the gyroscope.

In a translational motion, since the x-axis of the accelerometer coincides with a direction of travel of the vehicle, a change in acceleration is measured on the x-axis acceleration and no change in the z-axis angular velocity of the gyroscope is observed.

A rotational motion may be divided into a right turn and a left turn, and in a right turn situation, since the unmanned vehicle rotates clockwise around the z-axis, a negative angular velocity is measured on the z-axis angular velocity of the gyroscope. In this case, a negative angular velocity is measured on the x-axis of the accelerometer that coincides with the direction of travel, and a positive acceleration is measured in a direction of center of a radius of rotation (the y-axis of the accelerometer).

In a left turn situation, a negative angular velocity is measured on the x-axis and y-axis of the accelerometer, and a positive angular velocity is measured on the z-axis of the gyroscope. In this regard, FIG. 1 is a graph illustrating the relationship between x-axis and y-axis acceleration and z-axis angular velocity. Specifically, it can be seen that in the left turn situation, a negative acceleration is measured on the x-axis and y-axis of the accelerometer, and a positive angular velocity is measured on the z-axis of the gyroscope.

Hereinafter, a process of deriving a transformation equation using linear system identification is described.

The present invention proposes a yaw angular velocity recovery technique using the relationship between the measurement value of the accelerometer and the measurement value of the gyroscope. To this end, a system identification (or linear system identification) technique may be used.

The system identification technique is a method of deriving a relational expression by identifying an approximation to physical characteristics of an actual system. In the system identification, a statistical method is used to build a mathematical model of a dynamic system from measured data (input and output), and in the present invention, input data and output data are defined as the x-axis and y-axis measurement values of the accelerometer and the z-axis measurement value (yaw angular velocity) of the gyroscope, respectively.

The accuracy of the mathematical model depends on a quality of a dataset used to identify the system, and to achieve high recovery accuracy, the dataset should be collected to reflect many operations of the unmanned vehicle.

The system identification is performed from the collected data set to construct a system model for the relationship between the z-axis measurement value of the gyroscope and the x-axis and y-axis measurement values of the accelerometer. The following linear differential equation is a relational expression describing the system model.

$$g_z(t) = A \times \frac{da_x(t)}{dt} + B \times \frac{da_y(t)}{dt} + C \qquad \text{[Equation]}$$

In the equation above, t is time, and $g_z(t)$, $a_x(t)$, and $a_y(t)$ are the z-axis measurement value of the gyroscope, the x-axis and y-axis measurement values of the accelerometer, respectively. With the system identification, the coefficients A and B and the constant C that minimize an error may be estimated (or determined).

Hereinafter, a method of detecting an attack targeting a gyroscope and/or recovering a damaged measurement value of z-axis angular velocity is described.

The system model, which is constructed as a linear differential equation with A, B, and C determined, estimates the yaw angular velocity by receiving the measurement value of the accelerometer in real time. When a difference between the estimated yaw angular velocity and the yaw angular velocity actually measured by the gyroscope equals to or greater (or exceeds) a predetermined threshold (e.g., 0.03 rad/s), software in which the recovery technique is implemented may operate. In this case, when the difference exceeds the threshold, it may be determined that an attack targeting the gyroscope has occurred. The corresponding software isolates the yaw angular velocity actually measured by the gyroscope and allows the system to use the yaw angular velocity estimated by the system model.

When the difference in yaw angular velocity remains below (or equal to or less than) the threshold (e.g., 0.03 rad/s) for a certain period of time, the actual yaw angular velocity is released from the isolation and may be allowed to be used in the system.

Figure 2:
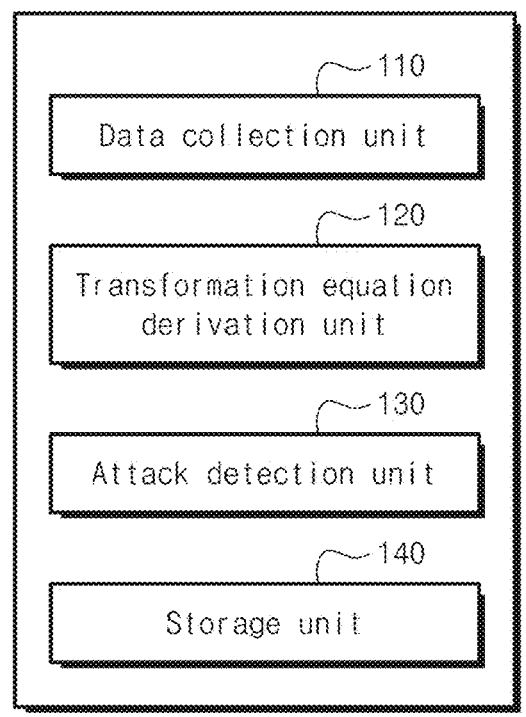
FIG. 2 is a functional block diagram of a device for detecting an attack on a gyroscope, according to an embodiment of the present invention.
Figure 3:
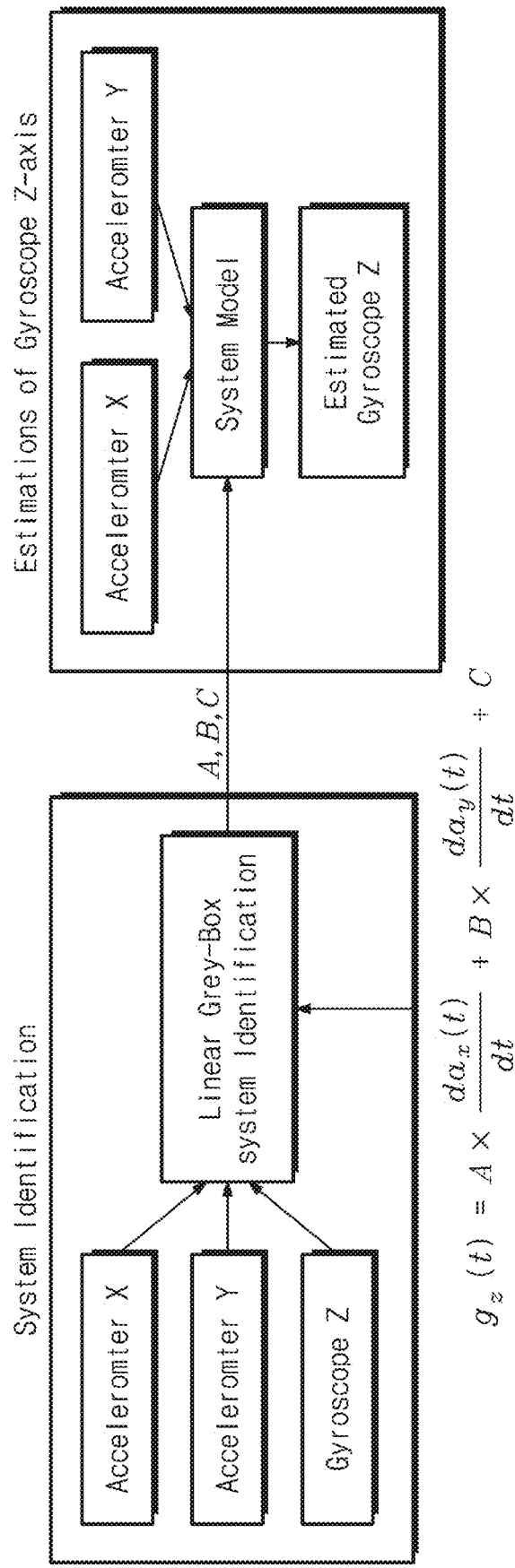
FIG. 3 is a flowchart for describing a method of detecting an attack by the device for detecting an attack illustrated in FIG. 2.

FIG. 2 is a functional block diagram of a device for detecting an attack on a gyroscope, according to an embodiment of the present invention, and FIG. 3 is a flowchart for describing a method of detecting an attack by the device for detecting an attack illustrated in FIG. 2.

A device 100 of detecting an attack (or referred to as an attack detection device) may be implemented as a computing device including at least a processor and/or memory. The processor is an element that controls an operation of the computing device and may be referred to as different names depending on the environment and device, such as a control unit, controller, a MiCom, a central processing unit (CPU), and the like. In addition, the computing device may be implemented as a PC, a smartphone, a tablet PC, smart glasses, a smart watch, a head mounted device (HMD), a navigation system, and the like. As another example, the computing device may be implemented as part of an unmanned vehicle, such as a vehicle (e.g., an autonomous or semi-autonomous vehicle) or a drone. Therefore, the method of detecting an attack on the gyroscope may also be understood as an operation of the computing device (e.g., processor).

The device 100 of detecting an attack may include at least one of a data collection unit 110, a transformation equation derivation unit 120, an attack detection unit 130, and a storage unit 140. According to an embodiment, the device 100 of detecting an attack may be understood to be a concept that includes an accelerometer and/or a gyroscope.

The data collection unit 110 may collect data that is used in the process of detecting an attack targeting the gyroscope and/or recovering sensor values. Specifically, the data collection unit 110 may collect first data used in the process of deriving the transformation equation and second data used in the process of detecting the attack.

To this end, the data collection unit 110 may receive a first acceleration value (e.g., an x-axis acceleration value) and a second acceleration value (e.g., a y-axis acceleration value) from the accelerometer, and an angular velocity value (e.g., a z-axis angular velocity value) from the gyroscope.

The first data may mean data used in the process of deriving the transformation equation. To this end, the data collection unit 110 may receive an output value from the sensor (the accelerometer or gyroscope) based on the movement of a device (which may be, for example, a drone or a vehicle) equipped with the device 100 of detecting an attack (or equipped with the accelerometer and gyroscope). According to an embodiment, the first data may be received from a predetermined storage device, such as a USB storage device, or may be received through a wired or wireless communication network.

The second data is data for judging whether there is an attack targeting the gyroscope, which may mean a measurement value of the sensor (the accelerometer or gyroscope) received (in real time).

The transformation equation derivation unit 120 may use the first data to derive the transformation equation that uses the measurement value of the accelerometer to derive the measurement value of the gyroscope. The derivation of the transformation equation may be achieved using the (linear) system identification technique. That is, the transformation equation derivation unit 120 may use the first data to determine the values of the coefficients A and B and the constant C of the linear differential equation described above.

According to an embodiment, the transformation equation may be derived by a separate computing device and then stored in the device 100 for detecting an attack. In this case, the transformation equation derivation unit 120 may be omitted from the device 100 for detecting an attack.

The attack detection unit 130 may use the second data to detect whether there is a (signal injection) attack targeting the gyroscope. Specifically, the attack detection unit 130 may estimate (or derive) the measurement value of the gyroscope, for example, the z-axis angular velocity, from the measurement value of the accelerometer (the x-axis acceleration and the y-axis acceleration) received in real time using the transformation equation.

The attack detection unit 130 may judge whether there is an attack targeting the gyroscope by comparing the estimated angular velocity to the measured angular velocity. Specifically, the attack detection unit 130 may determine that an attack on the gyroscope has occurred when the difference between the estimated angular velocity and the measured angular velocity exceeds the predetermined threshold. In contrast, the attack detection unit 130 may determine that an attack on the gyroscope has not occurred when the difference between the estimated angular velocity and the measured angular velocity does not exceed the predetermined threshold.

When an attack on the gyroscope is detected, by using the estimated angular velocity instead of the angular velocity measured by the gyroscope, the movement of the device (e.g., a vehicle or drone) equipped with the device 100 for detecting an attack may be controlled regardless of whether there is an attack.

The storage unit 140 may store a program, a source code, an application, or the like for operation of the device 100 for detecting an attack. In addition, the storage unit 140 may store the first data and second data collected by the data collection unit 110, the transformation equation derived by the transformation equation derivation unit 120, the transformation equation derived by the separate computing device, and an attack detection result provided by the attack detection unit 130.

EXAMPLE

Figure 4:
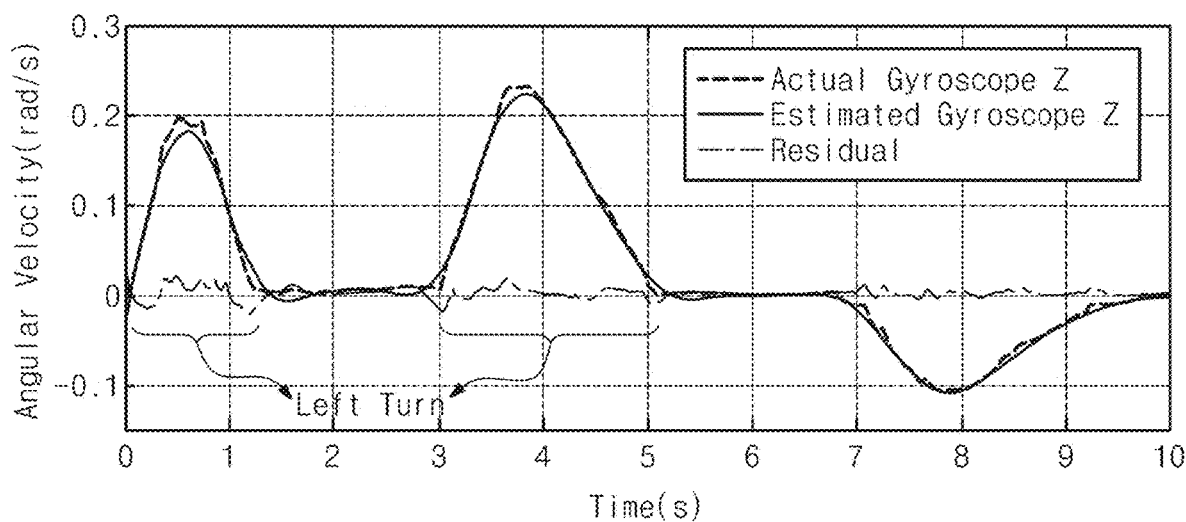
FIG. 4 illustrates a graph of measurement values of actual yaw angular velocities and yaw angular velocities estimated by the device for detecting an attack.

The system model resulting from the system identification may be constructed using the linear differential equation where A, B, and C are determined and may be used to estimate the yaw angular velocity. To compare the actual measurement value of yaw angular velocity to the estimated value using the system model, residuals were calculated, and an average residual of 0.030 rad/s and a maximum residual of 0.0373 rad/s were measured. FIG. 4 illustrates a graph of the measurement values of the actual yaw angular velocities and the yaw angular velocities estimated by the system model, that is, the device for detecting an attack.

Figure 5:
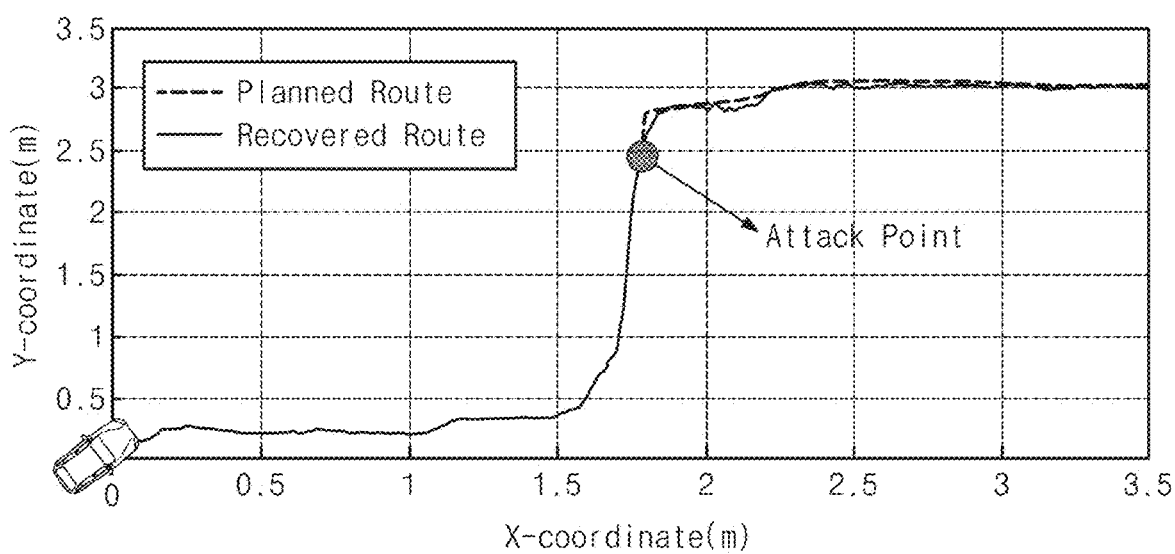
FIG. 5 illustrates movement coordinates of an unmanned vehicle that traveled along a planned route (in orange) and movement coordinates of an unmanned vehicle that traveled with a recovery technique applied (in blue).

In addition, it was confirmed that the unmanned vehicle can travel along the route normally when the recovery technique described in the present invention is used in a situation where the measurement value of the actual yaw angular velocity is manipulated. FIG. 5 illustrates movement coordinates of the unmanned vehicle that traveled along a planned route (in orange) and movement coordinates of the unmanned vehicle that traveled with the recovery technique applied (in blue).

The device described above can be implemented as hardware elements, software elements, and/or a combination of hardware elements and software elements. For example, the device and elements described with reference to the embodiments above can be implemented by using one or more general-purpose computer or designated computer, examples of which include a processor, a controller, an ALU (arithmetic logic unit), a digital signal processor, a microcomputer, an FPGA (field programmable gate array), a PLU (programmable logic unit), a microprocessor, and any other device capable of executing and responding to instructions. A processing device can be used to execute an operating system (OS) and one or more software applications that operate on the said operating system. Also, the processing device can access, store, manipulate, process, and generate data in response to the execution of software. Although there are instances in which the description refers to a single processing device for the sake of easier understanding, it should be obvious to the person having ordinary skill in the relevant field of art that the processing device can include a multiple number of processing elements and/or multiple types of processing elements. In certain examples, a processing device can include a multiple number of processors or a single processor and a controller. Other processing configurations are also possible, such as parallel processors and the like.

The software can include a computer program, code, instructions, or a combination of one or more of the above and can configure a processing device or instruct a processing device in an independent or collective manner. The software and/or data can be tangibly embodied permanently or temporarily as a certain type of machine, component, physical equipment, virtual equipment, computer storage medium or device, or a transmitted signal wave, to be interpreted by a processing device or to provide instructions or data to a processing device. The software can be distributed over a computer system that is connected via a network, to be stored or executed in a distributed manner. The software and data can be stored in one or more computer-readable recorded medium.

The program for implementing the aforementioned method may be recorded in computer-readable record media. The media may include, for example, a semiconductor storage device such as an SSD, ROM, RAM, and a flash memory, magnetic disk storage media such as a hard disk and a floppy disk, optical record media such as disc storage media, a CD, and a DVD, magneto optical record media such as a floptical disk, and at least one type of physical device capable of storing a specific program executed according to a call of a computer such as a magnetic tape.

Although the present invention is described with reference to the example embodiments illustrated in the drawings, it is provided as an example only and it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, other implementations, other example embodiments, and equivalents are within the scope of the following claims.

What is claimed is:

1. A device for detecting an attack targeting a gyroscope, the device comprising:
    a data collection unit configured to receive measurement values from an accelerometer and the gyroscope; and
    an attack detection unit configured to:
    estimate a z-axis angular velocity from an x-axis acceleration and a y-axis acceleration using a transformation equation, and
    detect an attack by comparing the estimated z-axis angular velocity to a measured z-axis angular velocity measured by the gyroscope.

2. The device of claim 1,
    wherein the data collection unit receives the x-axis acceleration and the y-axis acceleration from the accelerometer, and the measured z-axis angular velocity from the gyroscope.

3. The device of claim 1,
    wherein the transformation equation is derived using a linear system identification technique based on a dataset including x-axis acceleration, y-axis acceleration, and z-axis angular velocity.

4. The device of claim 1,
    wherein the attack detection unit is configured to determine that an attack targeting the gyroscope has occurred when a difference between the estimated z-axis angular velocity and the measured z-axis angular velocity exceeds a predetermined threshold.

5. A device for detecting an attack comprising:
    a data collection unit configured to collect first data and second data;
    a transformation equation derivation unit configured to derive a transformation equation to estimate a z-axis angular velocity from an x-axis acceleration and a y-axis acceleration using a linear system identification technique and the first data; and
    an attack detection unit configured to estimate a z-axis angular velocity from an x-axis acceleration and a y-axis acceleration included in the second data using the transformation equation, and to detect an attack targeting a gyroscope based on the estimated z-axis angular velocity.

6. The device of claim 5,
    wherein the transformation equation derivation unit derives the transformation equation using training data collected from multiple vehicle maneuvers including both right-turn and left-turn operations.

7. The device of claim 5,
    wherein the attack detection unit is configured to detect the attack by comparing the estimated z-axis angular velocity to a measured z-axis angular velocity included in the second data.

8. The device of claim 7,
    wherein the attack detection unit determines that the attack targeting the gyroscope has occurred when a difference between the estimated z-axis angular velocity and the measured z-axis angular velocity exceeds a predetermined threshold.

* * * * *